United States Patent [19]
Vancoillie

[11] 3,935,393
[45] Jan. 27, 1976

[54] LINE CONDITION SIGNALLING SYSTEM
[75] Inventor: Rene Marcel Vancoillie, Meulebeke, Belgium
[73] Assignee: International Standard Electric Corporation, New York, N.Y.
[22] Filed: Jan. 31, 1974
[21] Appl. No.: 438,236

[30] Foreign Application Priority Data
Feb. 12, 1973   Netherlands...................... 7301959

[52] U.S. Cl. ........................................ 179/18 FA
[51] Int. Cl.² ................................... H04M 3/22
[58] Field of Search ....... 179/18 AB, 18 FG, 18 FF, 179/175.2 C, 18 FA

[56] References Cited
UNITED STATES PATENTS

| | | | |
|---|---|---|---|
| 2,892,037 | 6/1959 | Feiner............................ | 179/18 FC |
| 3,414,678 | 12/1968 | Hackenberg.................... | 179/18 AB |
| 3,573,383 | 4/1971 | Lauwers et al................. | 179/18 AB |
| 3,713,103 | 1/1973 | Risky............................. | 340/166 R |
| 3,808,377 | 4/1974 | Young............................ | 179/18 FA |
| 3,855,421 | 12/1974 | Pilling et al.................... | 179/18 FA |

FOREIGN PATENTS OR APPLICATIONS
1,762,356   4/1970   Germany........................ 179/18 FA Primary Examiner—Thomas W. Brown
Attorney, Agent, or Firm—James B. Raden; Delbert P. Warner

[57] ABSTRACT

The symmetrical line loop evaluating circuit included in this signalling system and used to pass or to block interrogating pulses to examine the closed or open condition of a subscriber line includes a first circuit comprising a diode the anode and cathode of which are capacitively coupled to the output and input of an interrogating and receiving circuit respectively and a second or gating circuit which prevents surge voltages from reaching the input of the receiving circuit in the case of an open line loop. The system will be manufactured in the thick-film version.

6 Claims, 1 Drawing Figure

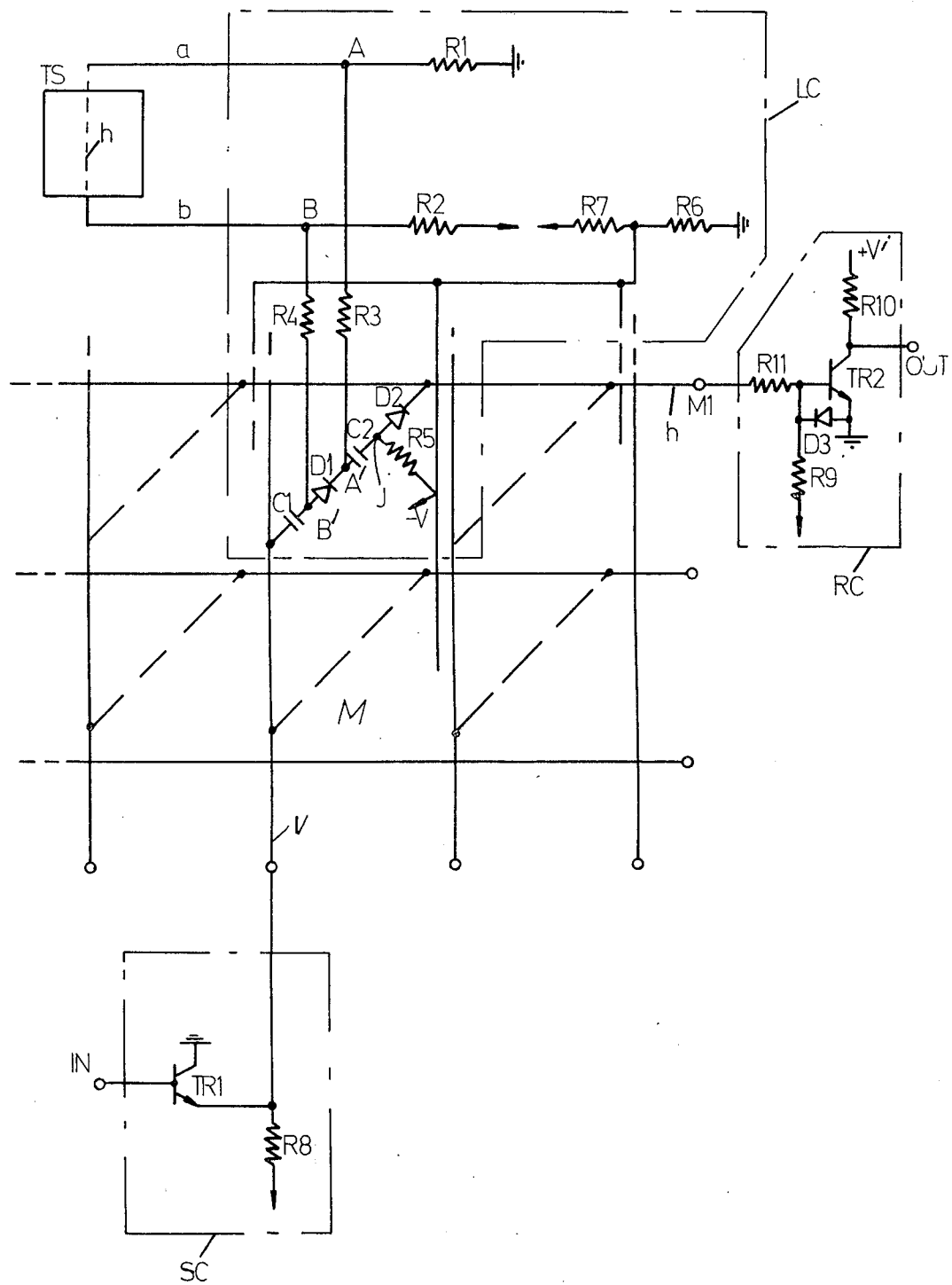

LINE CONDITION SIGNALLING SYSTEM

The present invention relates to a line condition signalling system including:
- at least one line;
- a line loop forming means;
- a signal source generating input signals;
- a detection circuit to detect the condition of said line;
- a line loop evaluating circuit passing or blocking said input signals depending on the condition of said line and including a first and a second circuit, said first circuit having inputs coupled to said line and to said signal source respectively and an output coupled to said detection circuit and said circuit having an input coupled to said line and an output coupled to said detection circuit, said second circuit preventing spurious signals on said line from reaching its output.

Such a system is known from the U.S. Pat. No. 2,892,370 and more particularly from FIG. 3 thereof. In this known system the first circuit of the loop condition evaluating circuit is a gate including a diode which is coupled to a line which is a telephone subscriber line. This diode enables and prevents the passage of input or interrogating pulses when the subscriber has not hooked off and has hooked off his telephone, respectively. The second circuit of the loop condition evaluating circuit is constituted by inhibiting means preventing spurious voltage signals induced on both wires of the telephone line loop from reaching the detection circuit when the above diode is normally blocked, i.e. when the called subscriber has taken his telephone handset off the hook. To this end the inhibiting means include a resistance capacitance network coupled to both ends of the above diode so that heavy voltage surges on the line find a low impedance path to ground before reaching the detection circuit. If these spurious voltage signals are low frequency signals the capacitances of the capacitors of the resistance capacitance network have to be sufficiently large to short-circuit these signals. Such large capacitors may be disadvantageous when use is made, for instance, of thin film techniques. Another disadvantage of the known system is that in order to isolate the cathode of the above diode from battery voltage a decoupling capacitor is inserted in the link connecting this cathode to the wire of the line which is coupled to battery. If low frequency spurious voltage signals are induced on both wires of the line loop during the open condition of the line loop, i.e. when the subscriber has not yet hooked off, the decoupling capacitor introduces a supplementary voltage drop so that the voltages do not increase with an equal amount and the above diode may become blocked. In this case the interrogation pulses are erroneously not allowed to reach the detection circuit.

It is an object of the present invention to provide a system which does not present the above drawbacks and wherein more particularly no relatively large capacitors are required.

The invention is characterized in that said second circuit is constituted by gating means which are coupled between said output of said first circuit and said detection circuit and which cooperate with said first circuit to pass or block said input signals.

The above mentioned and other objects and features of the invention will become more apparent and the invention itself will be best understood by referring to the following description of an embodiment taken in conjunction with the accompanying drawing which is a schematic view of a line condition signalling system according to the present invention. This line condition signalling system which forms part of an automatic telecommunication switching system includes a telephone line loop condition evaluating circuit LC, a telephone subscriber station TS with hook switch contact $h$, and, connected via a telephone line $a$, $b$ to a first input of the line loop condition evaluating circuit LC, a signal source SC and a detection circuit RC. This line loop evaluating circuit LC includes a first and a second circuit. The first circuit comprises the series connection of a capacitor C1, a diode D1 and a capacitor C2. The cathode of the diode D1 being connected to ground via the series connected resistors R3 and R1 while its anode is connected to battery via the series connected resistor R4 and R2. The junction points A and B of these series connected resistors R1, R3 and R2, R4 are connected to the $a$ and $b$ wires of the above telephone line respectively. The second circuit is a gating circuit which includes a diode D2 negatively biased via resistor R5 at a voltage $-V$ determined by the tapping point of a potentiometer R6, R7.

The above mentioned automatic telecommunication system includes a plurality of circuits such as LC and the elements, such as C1, D1, C2, D2 and R5, of each such circuit are arranged in a matrix M. Hereby it should be noted that the potentiometer R6, R7 is common to all these circuits. The vertical leads such as $v$ of this matrix M are each connected to an individual signal source such as SC. This signal source SC includes an NPN transistor TR1 the base of which constitutes the input terminal IN of the signal source SC. The collector of this transistor is grounded, while its emitter is connected on the one hand to the vertical lead $v$ and on the other hand to a $-48$ Volts battery via resistor R8. Normally, the transistor TR1 is blocked, but means (not shown) are provided to operate the signal sources such as SC in succession by bringing the corresponding transistors TR1 to saturation and thus applying a voltage pulse of approximately 48V in succession to each of the vertical leads of the matrix M. The horizontal leads such as $h$ of the above matrix M are each connected to an individual detection circuit such as RC. This detection circuit RC includes an earthed emitter NPN transistor TR2 the base of which is connected to the horizontal lead h via resistor R11 on the one hand and to battery via resistor R9 on the other hand. A diode D3 poled as shown is branched across the base-to-emitter junction of this transistor. Its collector is connected to the output terminal OUT of RC on the one hand and to a voltage $+V'$ via resistor R10 on the other hand. Normally, the transistor TR2 is cut-off since its base is maintained at a slightly negative potential with respect to its emitter due to diode D3 being connected to battery via the resistor R9.

From the above it follows that the line loop evaluating circuit LC includes a first and a second circuit. The first circuit has a first input connected to the line $a$, $b$, a second input connected to the signal source SC and an output connected to the input of the second circuit the output M1 of which is connected to the detection circuit RC.

In the two following cases the system operates as described below:

1. On-hook condition of the hook switch contact h in the subscriber station TS In case the subscriber has not taken his telephone handset off the hook, the switch contact $h$ and therefore the line loop $a$, $h$, $b$ both are open. The diode D1 is blocked since it is reversely biased between battery and ground via resistors R2, R4 and R1, R3 respectively. The capacitor C1 is not charged while the capacitor C2 is charged between ground and the negative voltage −V which is present at the junction point of the resistors R6, R7. Now, when transistor TR1 of signal source SC is saturated by a short pulse applied at its base input IN a pulse with a peak voltage at 0 volt and a voltage value 48V is applied to the anode of the diode D1, the cathode of which is at earth potential. This pulse is unable to pass through the diode D1 and the transistor TR2 of the detection circuit RC remains in its non-conductive state.

Currents induced by external sources and appearing on both wires $a$, $b$ raise or lower the potential at the anode and cathode of the diode D1 in approximately equal amounts so that the operation of the diode D1 is unaffected. The negative bias on the diode D2 of the above second circuit prevents spurious voltage pulses appearing at the wire $a$ and hence at the anode of the diode D2 from passing through this diode D2 and appearing at the output M1.

2. Off-hook condition of the hook switch h in the subscriber station TS

In case the subscriber has taken his telephone handset off the hook, the switch contact $h$ and the line loop $a$, $h$, $b$ both are closed. Due to the DC current flowing in the closed line loop from ground to negative battery via the resistors R1 and R2 the potentials VA and VB of the junction points A and B decrease and increase with respect to the potentials of these points in the above considered on-hook condition, respectively. Consequently the diode D1 is negatively biased and the capacitor C1 is charged since the voltage at its right hand plate (junction point B' between C1 and D1) is more positive than the battery voltage at its left hand plate. The capacitor C2 is first discharged and then charged positively when the potential of junction point A' decreases below the potential −V at the tapping point of the potentiometer R6, R7. When an input or interrogating voltage pulse with a peak voltage at 0 volt and a voltage value of 48 V is applied to the vertical conductor $v$ by the signal source SC, this pulse passes through the capacitor C1 so that the potential at the junction point B' between C1 and D1 increases and becomes equal to VB + 48V. Since VB + 48V is larger than VA the diode D1 becomes conductive during the time interval of the above voltage pulse. Neglecting the voltage drop across the diode D1, the potential at the junction point A' between D1 and C2 becomes equal to VB + 48V and since the capacitor C2 is charged at −V−VA the potential VJ at the junction point J between C2 and D2 becomes equal to VB + 48V − VA − V. When this voltage is more positive than the voltage at the base of transistor TR2 which is held at approximately −1 Volt the diode D2 becomes conductive and current flows to battery and ground via the resistors R11, R9 and the conductive diode D3 respectively. Due to this current the potential at the base of transistor TR2 increases and when it becomes larger than its base-to-emitter cut-in voltage the transistor TR2 becomes conductive. The base-to-emitter cut-in voltage is the positive base-to-emitter voltage above which the npn transistor TR2 becomes conductive.

Preference values of the constituent elements of the above circuit are as follows:

−V = −22V negative battery voltage = −48 V
VB = −32 V
VA = −16 V
VJ = −32 V+48 V+16 V−22 V = +10 V
R1 = R2 = 2 Kiloohms line resistance = 2 Kiloohms While the principles of the invention have been described above in connection with specific apparatus, it is to be clearly understood that this description is made only by way of example and not as a limitation on the scope of the invention.

I claim:

1. A line condition signalling system including at least one line;
   a line loop forming means;
   a signal source generating input signals;
   a detection circuit to detect the condition of said line;
   a line loop evaluating circuit passing or blocking said input signals depending on the condition of said line and including a first and a second circuit;
   said first circuit comprising a series connection of a first capacitor, a diode and a second capacitor;
   means including first and second terminals coupling said diode to said line to enable bias of the diode in accordance with the conditions of the line;
   means coupling the first capacitor to said signal source,
   means coupling the second capacitor to an input of said second circuit,
   means coupling the output of said second circuit to said detection circuit, and
   gating means in said second circuit for preventing spurious signals on said line from reaching its output, whereby
   said gating means, in cooperation with said first circuit and said detection circuit, passes said input signals when the line is closed and blocks said input signals when the line is open.

2. A line condition signalling system according to claim 1, in which said gating means includes a reversely biased asymetric conductive means.

3. A line condition signalling system according to claim 2, in which said asymmetric conductive means is constituted by a diode reversely biased by having its anode connected via a resistor to a tapping point of a potentiometer which is common to a plurality of said line loop evaluating circuits.

4. A line condition signalling system according to claim 1, in which said signal source includes a transistor connected as an emitter follower with an earthed collector.

5. A line condition signalling system according to claim 1, in which said detection circuit includes a transistor across the base-to-emitter junction of which an oppositely poled diode is branched.

6. A line condition signalling system including at lease one line; a line loop forming means; a signal source generating input signals; a detection circuit to detect the condition of said line; a line loop evaluating circuit passing or blocking said input signals depending on the condition of said line and including a first and a second circuit; said first circuit including inputs connected to said line and to said signal source respectively and an output connected to an input of said second circuit; said first circuit including a reversely biased diode, the anode and cathode of which are connected on the one hand to said signal source and to said gating means each via a capacitor and are connected on the other hand to a first and a second wire of said line loop via a first and a second resistor respectively; said second circuit having its input connected to said line as well as to said first circuit, and an output coupled to said detection circuit; said second circuit including gating means preventing spurious signals on said line from reaching its output; and means coupling said gating means between the output of said first circuit and the input of said detection circuit to cooperate with said first circuit and pass or block said input signals.

* * * * *